April 29, 1952
R. C. HIATT
2,594,776
NUT PICKING AND SEPARATING MACHINE
Filed Nov. 17, 1947
3 Sheets-Sheet 1
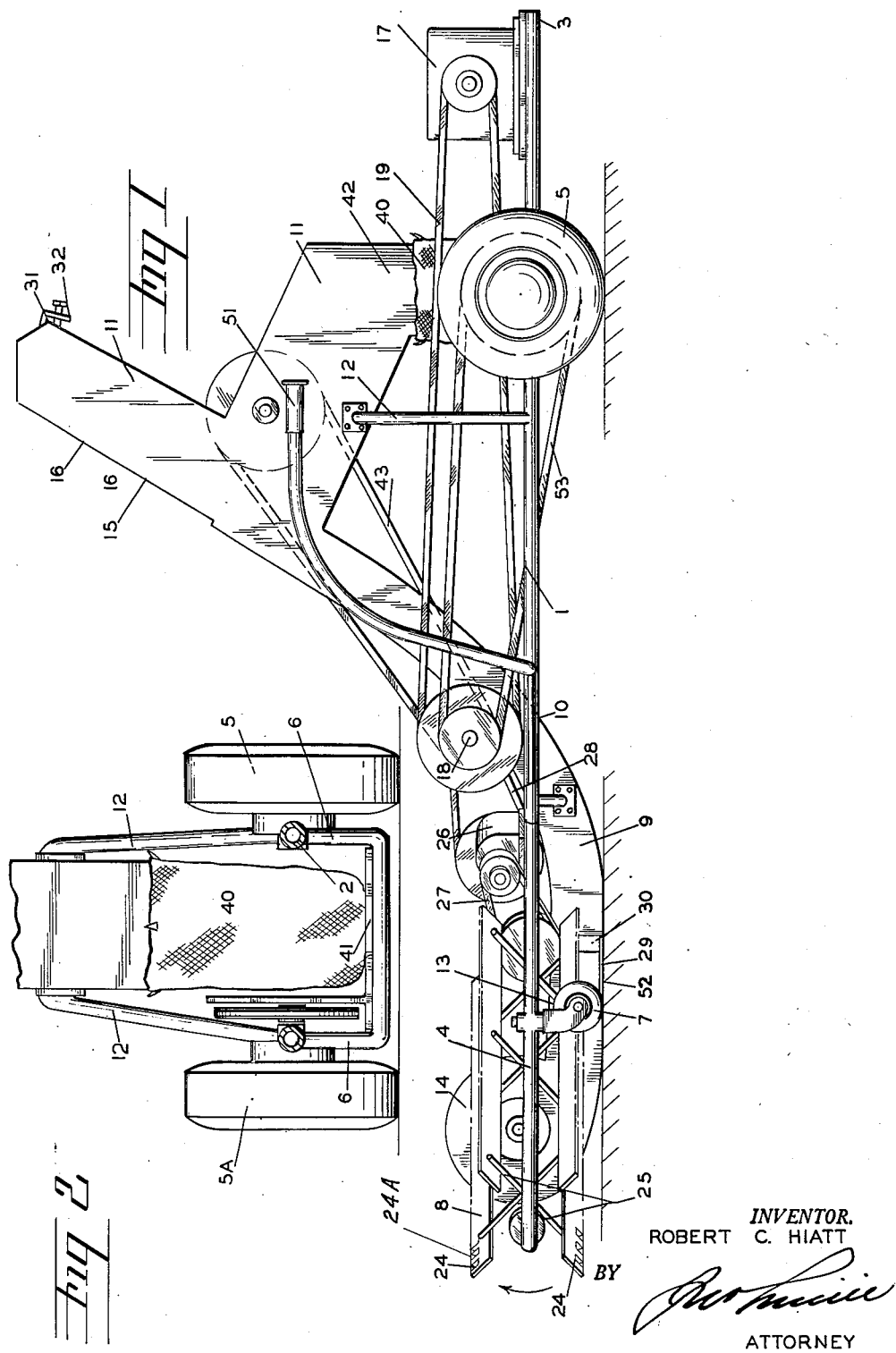
INVENTOR.
ROBERT C. HIATT
BY
ATTORNEY

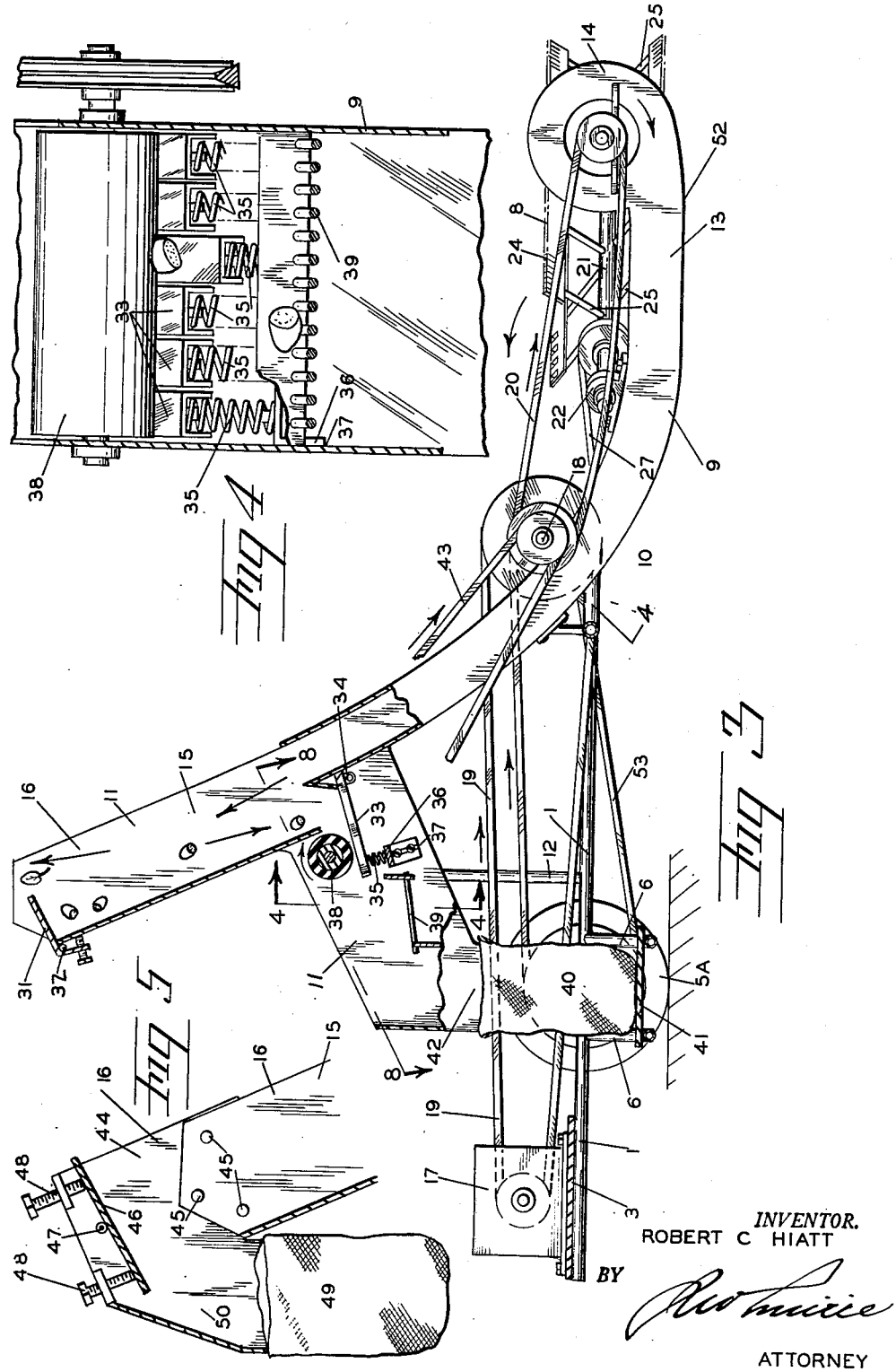

April 29, 1952 R. C. HIATT 2,594,776
NUT PICKING AND SEPARATING MACHINE
Filed Nov. 17, 1947 3 Sheets-Sheet 3
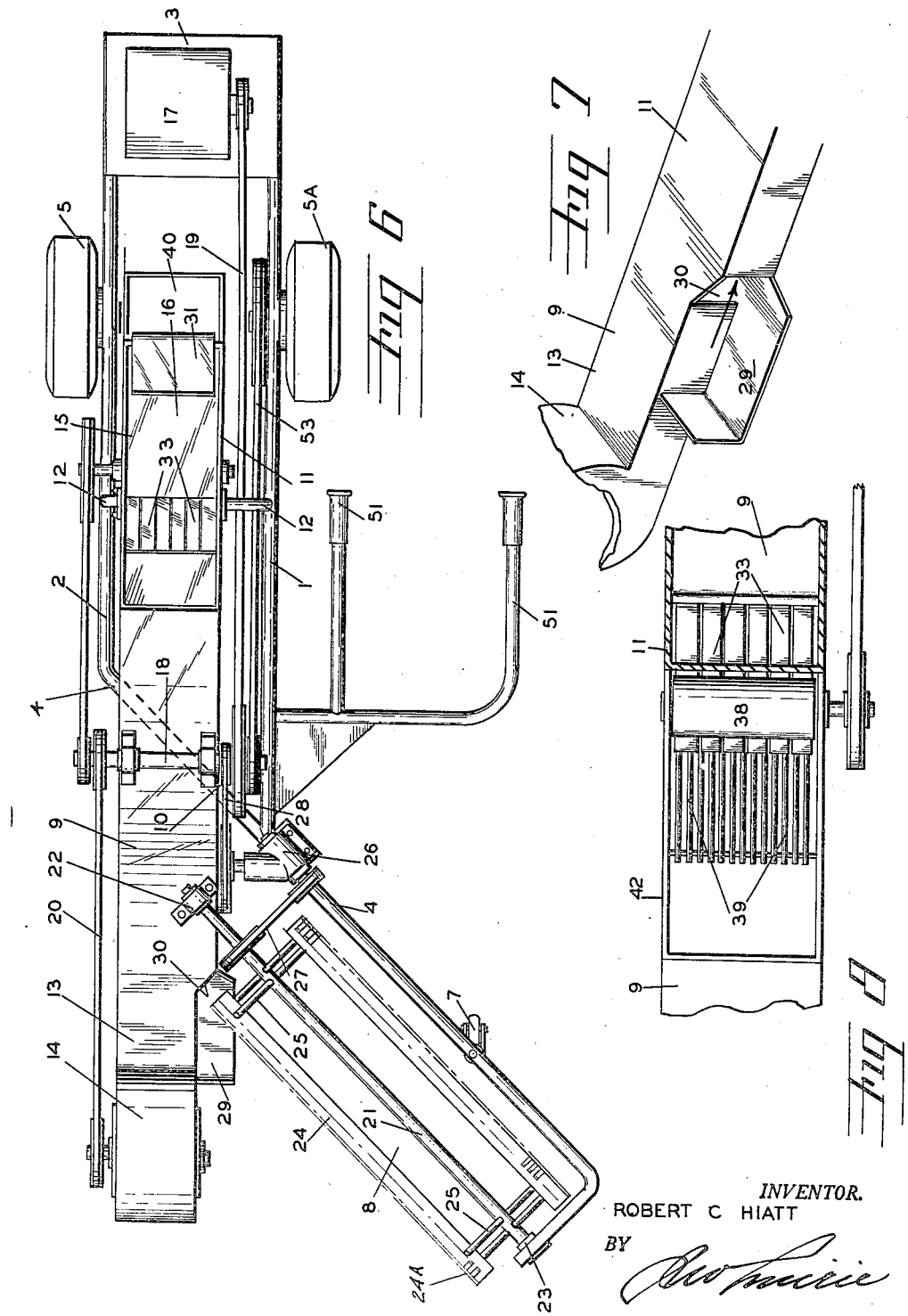
INVENTOR.
ROBERT C HIATT
BY
ATTORNEY Patented Apr. 29, 1952

2,594,776

UNITED STATES PATENT OFFICE 2,594,776

NUT PICKING AND SEPARATING MACHINE

Robert C. Hiatt, Hillsboro, Oreg.

Application November 17, 1947, Serial No. 786,402

1 Claim. (Cl. 209—27)

This invention relates to nut picking machines and is particularly adapted for picking filberts, walnuts and the like.

The primary object is to build a nut picking machine employing a rotating sweeper working in combination with an air conveyor for picking the nuts off the ground and conveying them through a cleaning or separating zone before delivering them into sacks.

Another object of the invention is to accomplish the above object in such a manner that one man can operate a machine.

By the use of a simple rotary sweeper sweeping the nuts into an air conveyor delivering the same past specially arranged baffles, the leaves and light particles are separated from the nuts and heavy clods of dirt, the nuts and dirt striking the baffles causing them to fall into a dirt crushing apparatus for crushing the clods and delivering the nuts into receiving sacks when the clods have been broken and separated from them.

Another object of the invention is to provide an attachment to be attached to the air conveyor for harvesting the duchillies in the case of filberts. This device separates the duchillies from the leaves and lighter materials.

These and other incidental objects will be apparent in the drawings, specification and claim.

Referring to the drawings:

Figure 1 is a side view of my new and improved nut picking machine.

Figure 2 is a sectional view of Figure 1.

Figure 3 is a view taken from the opposite side, parts being broken away for convenience of illustration.

Figure 4 is an enlarged fragmentary view taken on line 4—4 of Figure 3 illustrating the clod breaking feature of my picker.

Figure 5 is a fragmentary view of the air conveyor having the special attachment for processing duchillies.

Figure 6 is a plan view of the assembled machine.

Figure 7 is a perspective fragmentary view of the air stream opening and gathering pan.

Figure 8 is a sectional view taken on lines 8—8 of Figure 3 illustrating the platforms and gratings.

In the drawings:

My new and improved nut picking machine consists of longitudinal frames 1 and 2 connected together at their one end by the platform 3, and at their opposite or forward ends by the frame 4 extending transversely and diagonally from the said frames 1 and 2. Supporting wheels 5 are mounted to the upwardly extending frame portions of U-frames 6 and are for supporting the general overall weight of the machine. A caster wheel 7 supports the transverse frame 4 together with the sweeper rotor assembly 8.

A tubular air conveyor 9 is mounted to the transverse frame 4 at 10 and has the housing 11 forming part thereof offset and extending rearwardly from the upper outlet end of conveyor 9 proper with a bottom discharge opening, which in turn is supported by the upstanding frame members 12. The lower end 13 of the air tube 9 terminates in an air blower 14, while the upper end 15 is open to the atmosphere at 16.

A power plant or motor 17 is mounted to the platform 3 and drives the countershaft 18 through the belt 19. The blower 14 is driven by the belt 20 from the countershaft 18. The rotor or sweeping assembly 8 consists of a shaft 21 journalled in the bearing 22 on its one end and within the bearing 23 at its opposite end, said bearing 23 being mounted to the frame member 4. Paddles or sweepers 24 are secured to the shaft 21 through the arms 25 and revolve therewith. The shaft 21 is rotated by the gear box 26 through the belt 27, said gear box being operated by the belt 28 from the countershaft 18.

In operation the rotor assembly 8 is rotated in the direction of the arrows sweeping the nuts, leaves and clods ahead of the same and towards the pick up pan 29 due to the fact that the rotor assembly is set at an angle to the center line of the machine. The pan 29 forms part of the lower end 13 of the conveyor tube 9, has an upright baffle at its front end and registers with the opening 30 at its rear end inclined transversely and leading into conveyor 9. This pan delivers the nuts, leaves and clods into the air stream being produced by the blower 14. As the nuts, clods and leaves enter the air stream they are blown up through the conveyor 9, the nuts and clods striking the baffle 31 which is adjustably mounted at 32 to the upper end of the housing 11. The leaves and light particles will be blown out at 16 into the atmosphere while the nuts and clods will fall back down on to the receiving platforms 33, referring to Figures 3, 4 and 8. The receiving platforms are pivotally mounted to the housing 11 at 34 at their inner ends and supported by the springs 35 at their outer ends, said springs resting upon the cross frame 36 which is adjustably mounted to the housing at 37.

A rubber covered roller 38 is journalled within the housing 11 and revolves in the direction of the arrow, when the nuts and clods fall on the platform 33, the nuts will pass through under the roller 38 without harm or breakage but the clods of dirt will be broken up falling down through the grating 39 to the ground while the nuts will pass over the grating into the receiving bag 40, said bag resting on the platform 41 and being secured to the spout 42 located in the lower end of the housing 11. The roller 38 is driven by the belt 43 from the countershaft 18.

In the picking of duchillies a special attachment 44 is secured to the upper end 15 of the housing 11, as by bolts 45. The baffle 31 will be removed when the attachment 44 is installed. An adjustable baffle 46 is pivotally mounted at 47 and is adjusted to any desired angle relative to the upper end of the housing by the adjusting screws 48. A receiving bag 49 is secured to the spout 50 of the attachment 44.

In the harvesting of duchillies the nuts having the husks remaining thereon strike the baffle 46 and fall into the bag 49, but the nuts having the husks removed strike the baffle 46 and drop down on to the platform 33 and under the roller 38 on to the grate 39 into the bag 40. The leaves and lighter particles are blown out through the opening 16. In order for this to happen the angle of the baffle 46 must be adjusted at just the right angle to accomplish this result. Due to the fact that the nuts with the husks are more easily blown by the air stream they will strike the baffle 46 and be deflected into the bag 49.

In the operation of my new and improved nut picker, the operator grasps the handles 51 for guiding the machine, which is normally supported on the supporting wheels 5 and the underside 52 of the lower end 13 of the conveyor 9 and the caster wheel 7. The operator can control the direction of travel of the machine through the handles 51. The machine is propelled by the driving belt 53 from the countershaft 18 to the driving wheel 5A.

As stated above the rotor assembly 8 is driven by the belt 27, gear box 26, belt 28 to the countershaft 18, which in turn is driven by the motor 17 through the belt 19. At the same time the blower 14 is driven by the belt 20, the paddles 24 are forcing the nuts onto the pan 29 and through the opening 30 into the conveyor 9. The air stream from the blower picks the same up blowing the leaves and light material out through the opening 16, allowing the nuts and clods to strike the baffle 31 or 46 and drop down on the platforms 33 where they will be rolled under the roller 28 breaking the clods into fine particles delivering the nuts onto the grating 39, thence into the receiving bag 40.

I do not wish to be limited to the exact mechanical construction as illustrated, as other modifications may be substituted still coming within the scope of my claim.

What is claimed as new, is:

A nut separating machine comprising a rearwardly extending tubular chute having an upwardly extending inclined rear end portion with a top discharge opening, a blower at the front end of the chute, means for delivering nuts and accompanying leaves and other light particles of foreign matter and dirt directly to and at an angle to the longitudinal center of the chute in rear of the blower to be carried along in the air stream from said blower, the upper portion of the chute being open at the top and front and having a rearwardly offset rear wall forming a bottom discharge opening, a rearwardly inclined housing at and below said opening and having a discharge opening at the back, an angularly adjustable baffle at the top of said chute above said opening, a rearwardly inclined platform beneath said opening and comprising a plurality of spaced individually hinged members resiliently supported, to receive the nuts and heavy foreign material blown up through the chute and falling by gravity.

ROBERT C. HIATT.

REFERENCES CITED

The following references are of record in the file of this patent:

UNITED STATES PATENTS

| Number | Name | Date |
| --- | --- | --- |
| 146,876 | Craven | Jan. 27, 1874 |
| 552,748 | Crippen | Jan. 7, 1896 |
| 971,608 | Hedfeldt | Oct. 4, 1910 |
| 988,707 | Hedfeldt | Apr. 4, 1911 |
| 1,022,587 | Higginbottom | Apr. 9, 1912 |
| 1,233,965 | Bishop et al. | July 17, 1917 |
| 1,330,488 | Nelson | Feb. 10, 1920 |
| 1,593,729 | Stebbins | July 27, 1926 |
| 1,631,423 | Lucas | June 7, 1927 |
| 1,808,928 | Lint | June 9, 1931 |
| 2,065,169 | Carpenter | Dec. 22, 1936 |
| 2,162,392 | Solomon, Jr. et al. | June 13, 1939 |
| 2,321,166 | Symons | June 7, 1943 |
| 2,394,745 | Brown | Feb. 12, 1946 |